(12) United States Patent
Sase et al.

(10) Patent No.: US 8,098,279 B2
(45) Date of Patent: Jan. 17, 2012

(54) IMAGING APPARATUS AND MICROSCOPE

(75) Inventors: Ichiro Sase, Yokohama (JP); Toshiaki Nihoshi, Yokohama (JP)

(73) Assignee: Nikon Corporation, Tokyo (JP)

( * ) Notice: Subject to any disclaimer, the term of this patent is extended or adjusted under 35 U.S.C. 154(b) by 448 days.

(21) Appl. No.: 12/429,181

(22) Filed: Apr. 23, 2009

(65) Prior Publication Data
US 2009/0201366 A1 Aug. 13, 2009

Related U.S. Application Data

(63) Continuation of application No. PCT/JP2007/073431, filed on Nov. 28, 2007.

(30) Foreign Application Priority Data

Nov. 30, 2006 (JP) .................................. 2006-324569

(51) Int. Cl.
*H04N 7/18* (2006.01)
(52) U.S. Cl. ....... 348/79; 348/220.1; 348/262; 359/378; 359/368; 359/205.1; 359/389; 359/363
(58) Field of Classification Search .................... 348/79, 348/220.1, 262
See application file for complete search history.

(56) References Cited

U.S. PATENT DOCUMENTS

| 6,091,911 | A  | * | 7/2000 | Sakano et al. | ................ 396/432 |
| 6,150,666 | A  |   | 11/2000 | Engelhardt et al. | |
| 6,437,913 | B1 | * | 8/2002 | Kishi | ............................ 359/389 |

FOREIGN PATENT DOCUMENTS

| JP | 61-32022 A   | 2/1986 |
| JP | 7-5370 A     | 1/1995 |
| JP | 2001-511902 T | 8/2001 |
| JP | 2005-31589 A  | 2/2005 |

* cited by examiner

*Primary Examiner* — Jude Jean Gilles
(74) *Attorney, Agent, or Firm* — Miles & Stockbridge P.C.

(57) ABSTRACT

Providing an imaging apparatus and a microscope capable of taking two-dimensional images of a sample at a plurality of observation positions different in the optical axis direction at the same time. The apparatus includes an image-forming lens 15 that forms images of a sample 4 on a plurality of image-forming places; an optical-path-dividing member 17, 18, 19 that divides an optical path from the same area in a plane perpendicular to an optical axis of the sample 4 so as to form the plurality of image-forming places; and an optical-path-length-changing member 27, 28, 29 that is provided on at least one optical path between the plurality of image-forming places and the imaging lens 15.

16 Claims, 4 Drawing Sheets

IMAGING APPARATUS AND MICROSCOPE

CROSS-REFERENCE TO RELATED APPLICATION

This application is a continuation of International Application No. PCT/JP2007/073431 filed Nov. 28, 2007.

TECHNICAL FIELD

The present invention relates to an imaging apparatus and a microscope.

BACKGROUND ART

Recently, it has been expected to take pictures of a sample at a plurality of observation positions different in the optical axis direction at the same time (for example, National Stage Patent Application Translated Version Publication No. 2001-511902).

However, since the microscope disclosed in National Stage Patent Application Translated Version Publication No. 2001-511902 is a confocal microscope, a two-dimensional image of a sample cannot be taken.

DISCLOSURE OF THE INVENTION

The present invention is made in view of the aforementioned problems, and has an object to provide an imaging apparatus and a microscope capable of taking two-dimensional images of a sample at a plurality of observation positions different in the optical axis direction at the same time.

In order to solve the problem, according to a first aspect of the present invention, there is provided an imaging apparatus comprising: an imaging lens that forms images of a sample on a plurality of image-forming places; an optical-path-dividing member that divides an optical path from the same area in a plane perpendicular to an optical axis of the sample so as to form the plurality of image-forming places; and an optical-path-length-changing member that is provided on at least one optical path between the plurality of image-forming places and the imaging lens.

According to a second aspect of the present invention, there is provided a microscope equipped with the imaging apparatus according to the first aspect.

The present invention makes it possible to provide an imaging apparatus and a microscope capable of taking two-dimensional images of a sample at a plurality of observation positions different in the optical axis direction at the same time.

EMBODIMENTS FOR CARRYING OUT THE INVENTION

A microscope equipped with an imaging apparatus according to each embodiment of the present invention is explained with reference to accompanying drawings.

First Embodiment

At first an overall structure of a microscope according to the present embodiment is explained.

Figure 1:
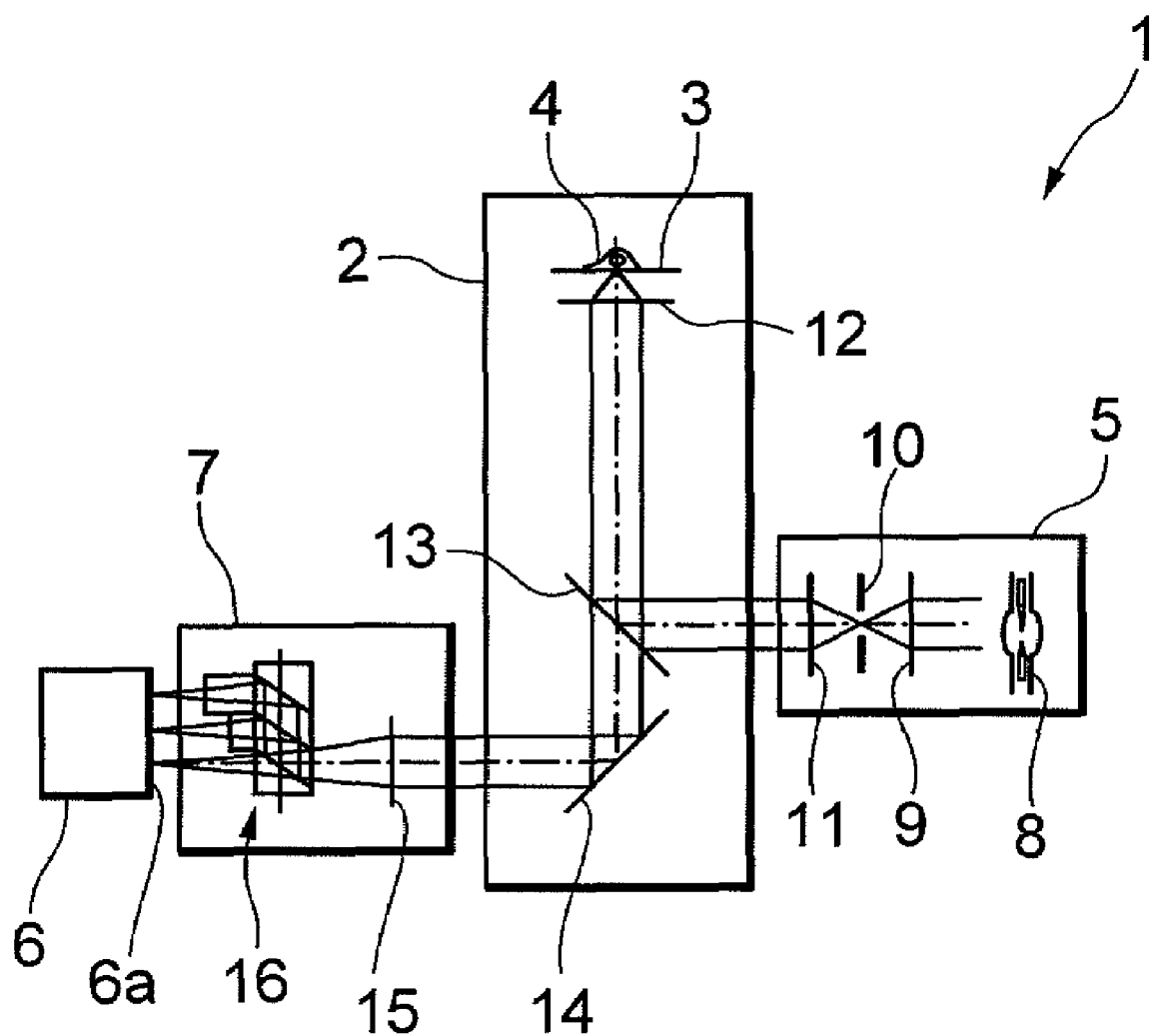
FIG. 1 is a diagram showing overall structure of a microscope according to a first embodiment of the present invention.

FIG. 1 is a diagram showing overall structure of a microscope according to a first embodiment of the present invention.

As shown in FIG. 1, the microscope 1 according to the present embodiment is composed of a microscope main body 2, an illumination portion 5 for illuminating a sample 4 placed on a stage 3 of the microscope main body 2, an image-forming portion 7 for converging light from the sample 4 on an imaging surface 6a of a camera 6, and the camera 6 for taking two-dimensional images of the sample 4.

The illumination portion 5 is equipped with an excitation light source 8 for exciting the sample 4 on the stage 3 by illuminating, a lens 9, a field stop 10, and a lens 11. The microscope main body 2 is equipped with an objective lens 12, a semi-transparent mirror 13 for leading excitation light from the illumination portion 5 to the sample 4 by reflection, and a total reflection mirror 14 for leading light from the sample 4 to the image-forming portion 7 by reflection, other than the aforementioned stage 3.

Then, the structure of the image-forming portion 7 that is the most characteristic portion of the present embodiment is explained in detail.

Figure 2A:
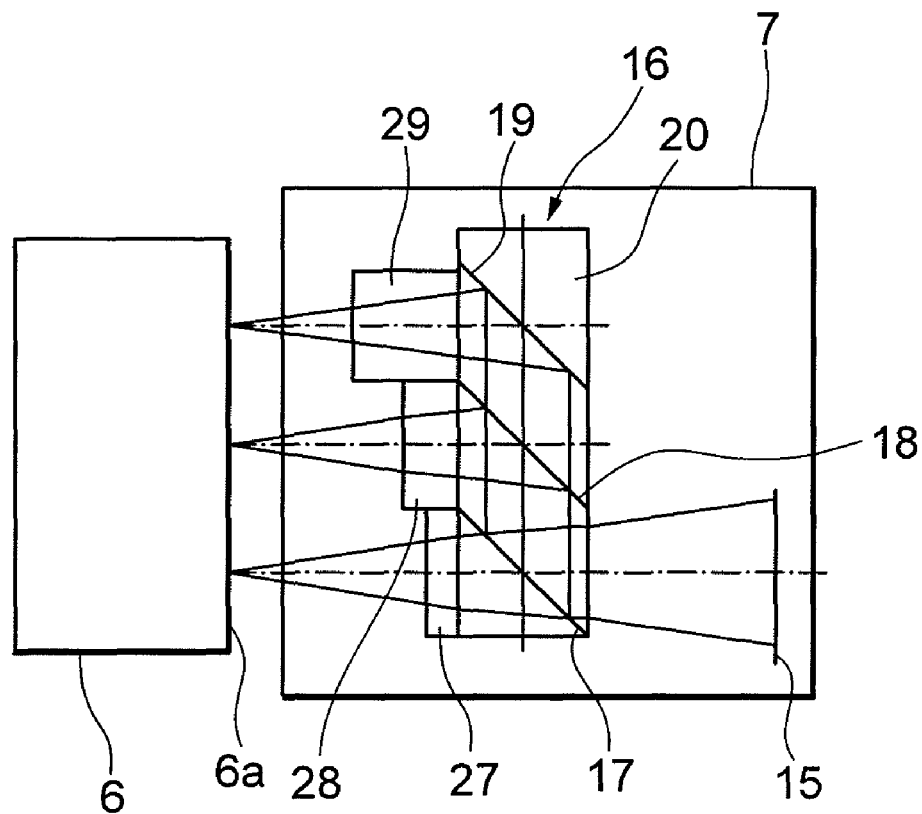
FIG. 2A is an enlarged view showing a structure of an image forming portion of the microscope according to the first embodiment of the present invention.

FIG. 2A is an enlarged view showing a structure of an image-forming portion 7 of the microscope 1 according to the first embodiment of the present invention.

The image-forming portion 7 is equipped with an image-forming lens 15 for converging light from the sample 4, and an optical-path-dividing-optical-path-length-changing member 16 for dividing light from the image-forming lens 15 to lead to the camera 6. The optical-path-dividing-optical-path-length-changing member 16 is composed of a prism portion 20 that is equipped with three reflecting portions 17, 18, 19 (reflecting portions 17 and 18 are semi-transparent mirrors), and three plane parallel plates 27, 28, 29 integrally provided on exit surface of the prism portion 20 corresponding to respective reflecting portions 17, 18, 19. As for the reflecting portions 17, 18, 19, for example, a semi-transparent mirror and a total reflection mirror are used.

In the inside of the prism portion 20, the reflecting portion 17 having transmittance of about 30% is provided on an exit optical axis of the image-forming lens 15. The plane parallel plate 27 is provided on the exit surface of the prism portion 20, which is also on a transmission optical path of the reflecting portion 17.

In the inside of the prism portion 20, the reflection portion 18 having transmittance of about 50% is provided on the reflection optical axis of the reflection portion 17 parallel to the reflection portion 17. The plane parallel plate 28 having larger thickness in the optical axis direction than the plane parallel plate 27 is provided on the exit surface of the prism portion 20, which is also on the reflection optical path of the reflection portion 18.

In the inside of the prism portion 20, the reflection portion 19 is provided on the transmission optical axis of the reflection portion 18 parallel to the reflection portion 18. The plane parallel plate 29 having larger thickness in the optical axis direction than the plane parallel plate 28 is provided on the exit surface of the prism portion 20, which is also on the reflection optical path of the reflection portion 19.

Figure 2B:
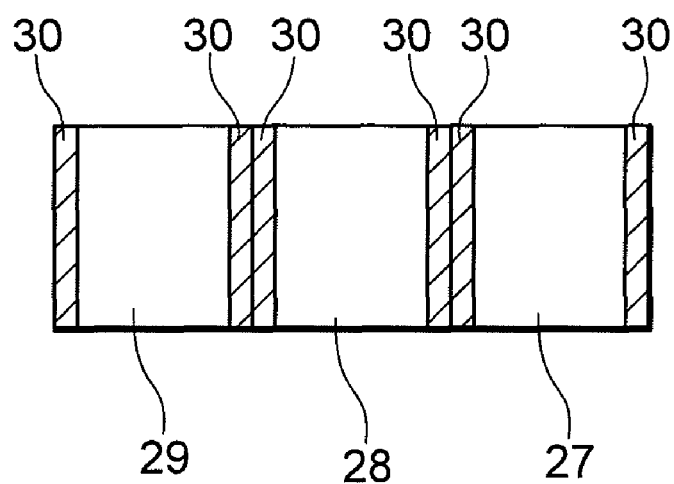
FIG. 2B is a diagram showing the shape of shielding portions provided of respective plane parallel plates of an optical-path-dividing-optical-path-length-changing member.

In the present embodiment, each of the plane parallel plates 27, 28, 29 is made of a glass plate, and on both sides of the exit surface thereof, there are provided shielding portions 30 having stripe shape extending perpendicularly to FIG. 2A as shown in FIG. 2B. FIG. 2B is a diagram showing the shape of shielding portions 30 provided on respective plane parallel plates 27, 28, 29 of an optical-path-dividing-optical-path-length-changing member 16.

With this configuration, in the microscope 1, excitation light emanated from the excitation light source 8 of the illumination portion 5 is led to the microscope main body 2 through, in order, the lens 9, the field stop 10, and the lens 11. The excitation light is reflected by the semi-transparent mirror 13 and irradiates the sample 4 on the stage 3 through the objective lens 12. Accordingly, fluorescence emanated from the sample 4 is reflected by the total reflection mirror 14 to be led to the image-forming portion 7 after passing through, in order, the objective lens 12 and the semi-transparent mirror 13.

Figure 3A:
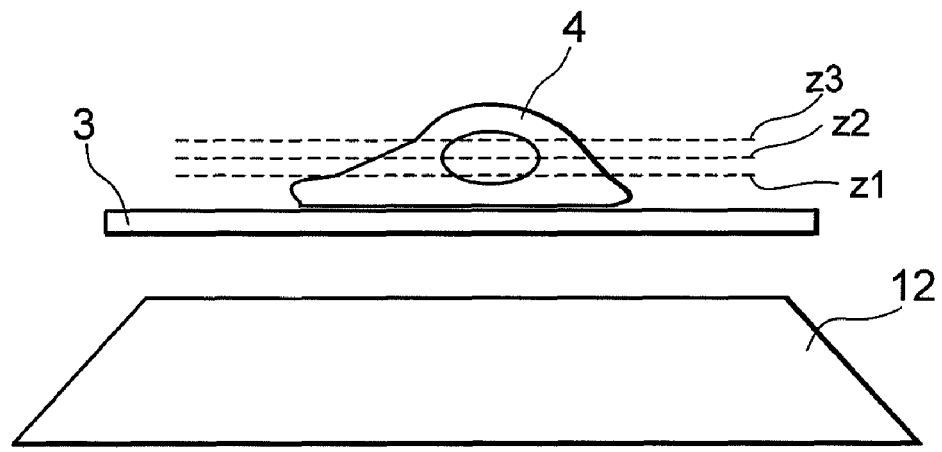
FIG. 3A is a diagram showing a plurality of observation positions different in an optical axis direction of a sample in the microscope according to the first embodiment of the present invention.

FIG. 3A is a diagram showing a plurality of observation positions different in an optical axis direction of a sample 4 in the microscope 1 according to the first embodiment of the present invention Taking an inverted microscope as an example, the optical path length of each optical path is explained. In the case the optical path is divided into three optical paths as shown in FIG. 2A, the intermediate optical path where the plane parallel plate 28 is there is assumed to be a reference position. The optical path leads the image of the observation position z2 in FIG. 3A to the camera 6. The upper optical path where the plane parallel plate 29 is there has longer optical path length than the intermediate optical path, which is the reference, and leads the image of the observation position z1 in FIG. 3A to the camera 6. The lower optical path where the plane parallel plate 27 is there has shorter optical path length than the intermediate optical path, which is the reference, and leads the image of the observation position z3 in FIG. 3A to the camera 6.

Light incident on the image-forming portion 7 is incident on the reflection portion 17 in the optical-path-dividing-optical-path-length-changing member 16 through the image-forming lens 15. The light transmitted through the reflection portion 17 among the light incident on the reflection portion 17 forms an image on the imaging surface 6a of the camera 6 through the plane parallel plate 27 (this is called as "a first image forming system"). In this case, the observation position of the sample 4 is the observation position z3 in FIG. 3A as described above.

On the other hand, the light reflected by the reflecting portion 17 among the light incident on the reflecting portion 17 is incident on the reflecting portion 18. The light reflected by the reflecting portion 18 among the light incident on the reflecting portion 18 forms an image on the imaging surface 6a of the camera 6 through the plane parallel plate 28 (this is called as "a second image forming system"). In this case, the observation position of the sample 4 is the observation position z2 in FIG. 3A as described above.

The light transmitted through the reflecting portion 18 among the light incident on the reflection portion 18 is reflected by the reflecting portion 19 to form an image on the imaging surface 6a of the camera 6 through the plane parallel plate 29 (this is called as "a third image forming system"). In this case, the observation position of the sample 4 is the observation position z1 in FIG. 3A as described above.

In this manner, the images of the sample 4 corresponding to three observation positions different in the optical axis direction are formed on the imaging surface 6a of the camera 6 putting three images side by side at the same time. In other words, three image-forming places corresponding to three observation positions different in the optical axis direction are formed on the imaging surface 6a of the camera 6 side by side at the same time.

Figure 3B:
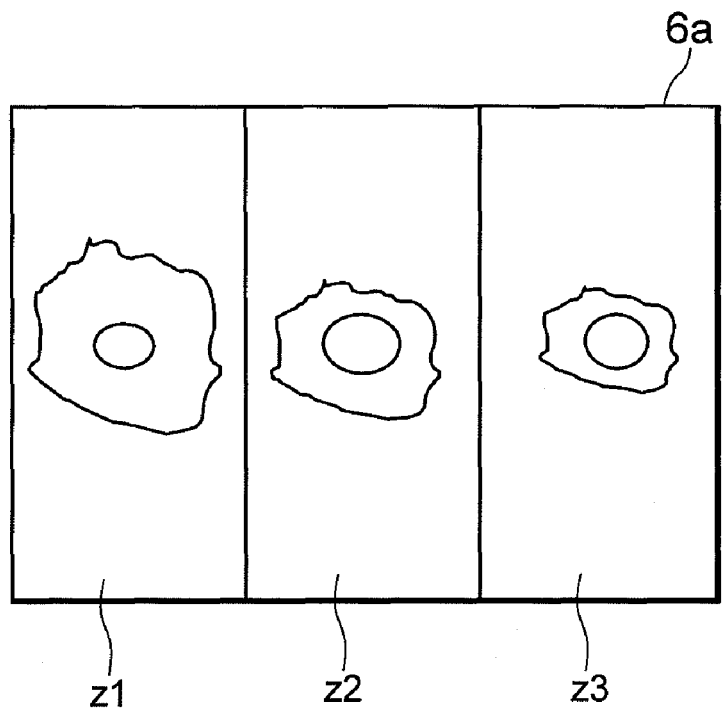
FIG. 3B is a diagram showing an aspect of an imaging surface of a camera where three images of the sample corresponding to three observation positions different in the optical axis direction are formed side by side at the same time.

In further detail, in the present embodiment, the optical path with non-parallel bundle of rays between the image forming lens 15 and the imaging surface 6a of the camera 6 is divided into three by the optical-path-dividing-optical-path-length-changing member 16, and by providing plane parallel plates 27, 28, 29 each having different thickness with each other into respective optical paths, the first image forming system, the second image forming system and the third image forming system each having different optical path length with each other are formed, so that three images of the sample 4 corresponding to three observation positions different in the optical axis direction are formed on the imaging surface 6a of the camera 6 putting three images side by side at the same time as shown in FIG. 3B (in the present embodiment, although three plane parallel plates 27, 28, 29 are used as described above, the plan parallel plate 27 is not indispensable, so that it is possible to use only the plane parallel plates 28 and 29. Accordingly, the camera 6 can take images of the sample 4 corresponding to three observation positions different in the optical axis direction as a single two-dimensional image in which three images are formed side by side. FIG. 3B is a diagram showing an aspect of an imaging surface 6a of a camera 6 where three images of the sample 4 corresponding to three observation positions different in the optical axis direction are formed side by side at the same time.

As described above, the present embodiment makes it possible to realize a microscope capable of taking two-dimensional images of the sample 4 corresponding to three observation positions z1, z2, z3 different in the optical axis direction at the same time. In this manner, since the state of the specimen can be imaged at the same time at a plurality of observation positions different in the optical axis direction, it becomes possible to observe spatially different phenomena in the optical axis direction occurred to the specimen at the same time. Therefore, according to analytic method, it becomes possible to carry out tracking observation of an object moving in XYZ directions in the specimen.

As described above, since images of the sample 4 corresponding to three observation positions z1, z2, z3 can be taken in a single two-dimensional image putting three images side by side, it is easy to observe. Moreover, since a plurality of cameras are not necessary to be prepared, simple configuration can be adopted.

In the present embodiment, each plane parallel plate 27, 28, 29 is provided with a shield portion as described above. With this configuration, since the images of the sample 4 corresponding to the three observation positions z1, z2, z3 formed on the imaging surface 6a of the camera 6 are separated on the imaging surface 6a as shown in FIG. 3B, the images can be prevented from being overlapped.

Transmittance of each reflecting portion 17, 18 is set as described above, so that the light amount of fluorescence led from each of the first image forming system, the second image forming system and the third image forming system to the imaging surface 6a of the camera 6 can be uniform. Accordingly, the brightness of the images of the sample 4 corresponding to the three observation positions z1, z2, z3 formed on the imaging surface 6a of the camera 6 can be uniform.

In the present embodiment, the optical-path-dividing-optical-path-length-changing member 16 is composed of the prism portion 20 equipped with the above-described three reflecting portions 17, 18, 19 and the plane parallel plates 27, 28, 29 each having different thickness. However, configuration of the optical-path-dividing-optical-path-length-changing member 16 is not limited to this, it may be constructed by only the three reflecting portions 17, 18, 19 excluding the prism portion 20 and the plane parallel plates 27, 28, 29. The optical path is divided into three by the three reflecting portions 17, 18, 19, and distances between the reflecting portions 17, 18, 19 are set such that each optical path forms image of the sample 4 on the imaging surface 6a of the camera 6, a first image forming system, a second image forming system and a third image forming system each having different optical path length can be formed, so that the object of the present invention can be accomplished.

In the present embodiment, the number of divided optical paths divided by the optical-path-dividing-optical-path-length-changing member 16 is not limited to three, by increasing or decreasing the mirror and the plane parallel plate to provide the optical path of two, or four or more, sample images of two, or four or more of the observation positions different in the optical axis direction can be taken at the same time.

In the present embodiment, with providing shielding portion 30 on each of the plane parallel plate 27, 28, 29, the three sample images formed on the imaging surface 6a of the camera 6 are prevented from overlapping with each other as described above. However, the present embodiment is not limited to this, a shielding portion having similar shape as the shielding portion 30 may be provided at the position of the illumination portion where the field stop 10 is there.

In the present embodiment, with setting transmittance to the each reflecting portion 17, 18 as described above, the brightness of the sample images formed on the imaging surface 6a of the camera 6 is made to be uniform. However, the transmittance of each reflecting portion 17, 18 is not limited to the above-described setting, for example, by using ordinary semi-transparent mirror and providing an light amount adjusting filter to each of the exit side of the plane parallel plate 27, 28, 29, the brightness of the sample images can be uniform.

Second Embodiment

At first an overall structure of a microscope according to the present embodiment is explained.

Figure 4A:
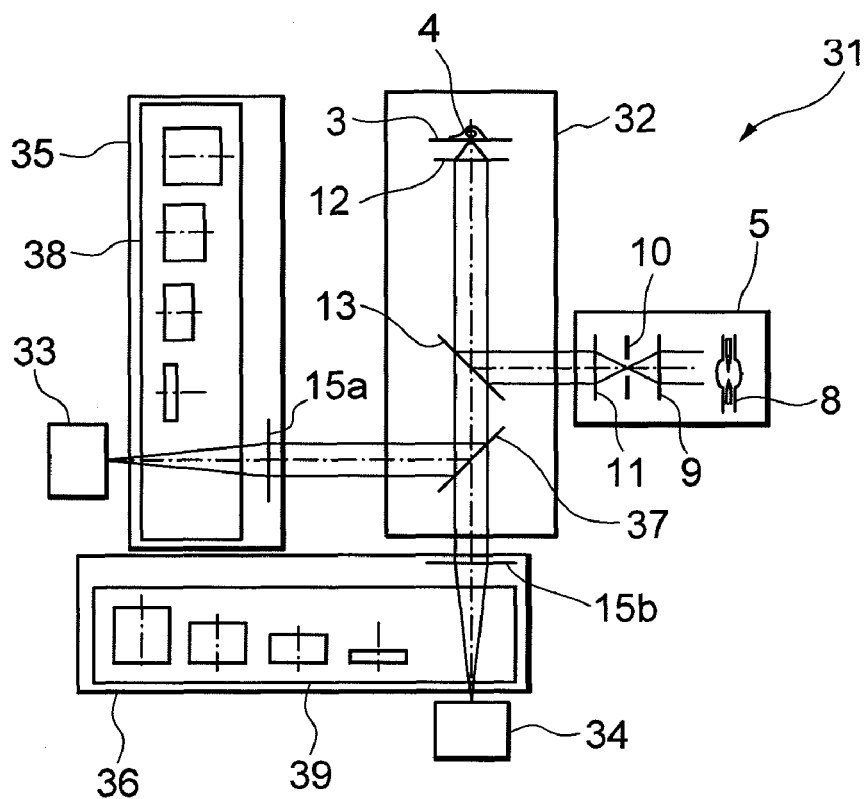
FIG. 4A is a diagram showing overall structure of a microscope according to a second embodiment of the present invention.

FIG. 4A is a diagram showing overall structure of a microscope according to a second embodiment of the present invention.

As shown in FIG. 4A, the microscope 31 according to the present embodiment is composed of a microscope main body 32, an illumination portion 5 for illuminating a sample 4 placed on a stage 3 of the microscope main body 32, two image-forming portions (a first image-forming portion 35, a second image-forming portion 36) for converging light from the sample 4 on imaging surfaces of cameras 33, 34 and the two cameras 33, 34 for taking two-dimensional images of the sample 4.

The illumination portion 5 is equipped with an excitation light source 8 for exciting the sample 4 on the stage 3 by illuminating, a lens 9, a field stop 10, and a lens 11. The microscope main body 32 is equipped with an objective lens 12, a semi-transparent mirror 13 for leading excitation light from the illumination portion 5 to the sample 4 by reflection, and a semi-transparent mirror 37 for leading light from the sample 4 to the first image-forming portion 35 and the second image-forming portion 36 by dividing the light other than the aforementioned stage 3.

Then, the structure of the two image-forming portions 35, 36 that is the most characteristic portion of the present embodiment is explained in detail.

The first image-forming portion 35 is equipped with an image-forming lens 15a for converging light from sample, and a plane parallel plate portion 38 provided between the image-forming lens 15a and the camera 33.

The plane parallel plate portion 38 is a unit equipped with four plane parallel plates provided in a direction perpendicular to an optical axis, each having different thickness along the optical axis direction, and slidable in a direction perpendicular to the optical axis. By sliding the plane parallel plate portion 38, the plane parallel plate having a given thickness can be selectively disposed on the optical path.

The second image-forming portion 36 has similar configuration as the first image-forming portion 35, so that explanations are omitted. In the plane parallel plate portion 39 in the second image-forming portion 36, four plane parallel plates each having different thickness in the optical axis direction from any of the four plane parallel plates in the first image-forming portion 35 are provided.

With this configuration, in the microscope 31, light emanated from the light source 8 of the illumination portion 5 is led to the microscope main body 32 through, in order, the lens 9, the field stop 10, and the lens 11. Then, the light is reflected by the semi-transparent mirror 13 to illuminate the sample 4 on the stage 3 through the objective lens 12. Accordingly, light from the sample 4 is incident on the semi-transparent mirror 37 through, in order, the objective lens 12, and the semi-transparent mirror 13. In the case of fluorescence observation, light form the light source 8 is excitation light, and light from the sample is fluorescence.

Light reflected by the semi-transparent mirror 37 among the light incident on the semi-transparent mirror 37 is led to the first image-forming portion 35. Then, the light forms an image on the imaging surface of the camera 33 through the image-forming lens 15a, and a given plane parallel plate in the plane parallel plate portion 38 (this is called as "a first image-forming system"). In this manner, the camera 33 makes it possible to take a two-dimensional image the sample 4.

On the other hand, the light transmitted through the semi-transparent mirror 37 among the light incident on the semi-transparent mirror 37 is led to the second image-forming portion 36. Then, the light forms an image on the imaging surface of the camera 34 through the image-forming lens 15b, and a given plane parallel plate in the plane parallel plate portion 39 (this is called as "a second image-forming system"). In this manner, the camera 34 makes it possible to take a two-dimensional image the sample 4. Incidentally, in each image-forming portion 35, 36 shown in FIG. 4A, an aspect that any plane parallel plate is not disposed on the optical path is shown.

As described above, in the present embodiment, since two image-forming portions are provided, and in each image-forming portion 35, 36, plane parallel plates having different thickness with each other are provided between the image-forming lens 15a, 15b and the camera 33, 34, in other words, on the optical path having non-parallel bundle of rays, the first image-forming system and the second image-forming system each having different optical path length are formed. Accordingly, on the imaging surfaces of the cameras 33, 34 provided on respective image-forming portions 35, 36, images of the sample 4 corresponding to different observation positions in the optical axis direction are formed and taken at the same time as two-dimensional images, respectively.

As described above, the present embodiment makes it possible to realize a microscope capable of taking two-dimensional images of the sample 4 corresponding to two different observation positions in the optical axis direction at the same time, so that the same effect as the first embodiment can be achieved. Moreover, in the two image-forming portions 35, 36, since a plane parallel plates having a given thickness can be disposed on each of the optical paths by sliding the plane parallel plate portions 38, 39, two-dimensional images of the sample 4 corresponding to various observation positions different in the optical axis direction can be taken.

Here, a numerical example of the shift amount A in the optical axis direction of the observation position of the sample 4 in accordance with the thickness of the plane parallel plate in the optical axis direction provided on the plane parallel plate portion 38, 39 is shown below in Table 1. The objective lens 12 is assumed to be "Plan Apo TIRF 100×H/1.45", and the reference observation position of the sample 4 is when the plane parallel plate is not disposed on the optical path.

TABLE 1

| focus shift amount Δ (μm) on the specimen upon using 100× Objective lens | thickness (mm) of plane parallel plate |
|---|---|
| 0.1 | 2.8 |
| 0.2 | 5.5 |
| 0.3 | 8.3 |
| 0.4 | 11.0 |
| 0.5 | 13.8 |

Figure 4B:
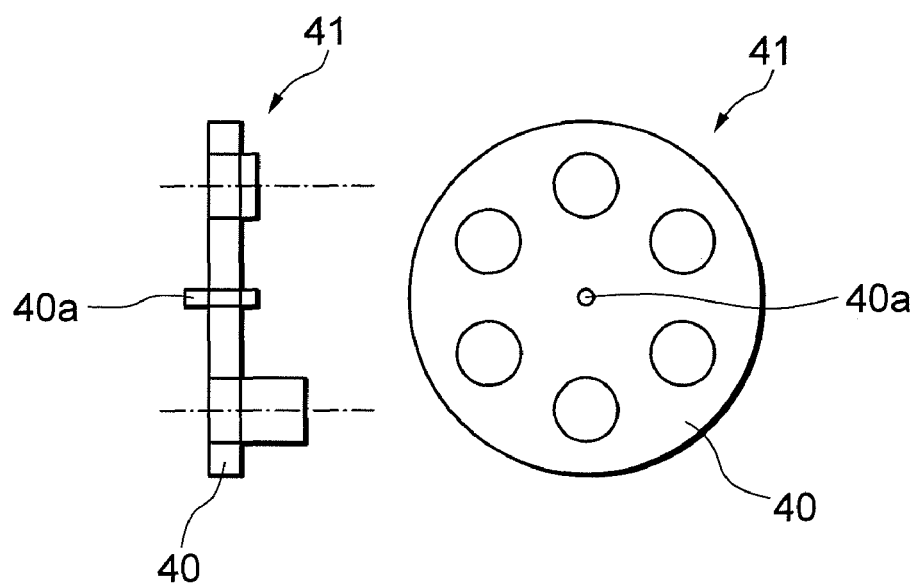
FIG. 4B is an enlarged view showing a structure of a turret that is a variation of the plane parallel plate portion of the microscope according to the second embodiment of the present invention.

In the present embodiment, a given plane parallel plate is put into or pulled out from the optical path by sliding the plane parallel plate portion 38, 39 in a direction perpendicular to the optical axis as described above. However, it is not limited to this, instead of the plane parallel plate portion 38, 39, the microscope 31 according to the present embodiment may be equipped with a turret 41 that a plurality of plane parallel plates are provided on a disc member 40 rotatable centered on a rotation shaft 40a as shown in FIG. 4B, and a given plane parallel plate can be selectively disposed on the optical path by rotating the disc member 40. With this configuration, the microscope 31 according to the present embodiment can effectively use internal space of the microscope in comparison with the case using the plane parallel plate portion 38, 39. FIG. 4B is an enlarged view showing a structure of a turret 41 that is a variation of the plane parallel plate portion 38, 39 of the microscope according to the second embodiment of the present invention.

As described above, although the microscope 31 according to the present embodiment equipped with two image forming portions 35, 36, it may be constructed only by the second image forming portion 36 excluding the semi-transparent mirror 37 and the first image forming portion 35. In this case, although two-dimensional images corresponding to a plurality of observation positions different in the optical axis direction cannot be obtained at the same time, since the plane parallel plate can be changed in high speed with high accuracy by sliding the plane parallel plate portion 39, change in observation positions in the optical axis direction can be carried out quickly in comparison with a conventional microscope in which change in the observation positions would be carried out by moving the stage and the objective lens in the optical axis direction.

As described above, each of the present embodiment makes it possible to provide an imaging apparatus and a microscope capable of taking two-dimensional images of a sample at a plurality of observation positions different in the optical axis direction at the same time.

What is claimed is:

1. An imaging apparatus comprising:
    an image-forming lens that forms images of a sample on a plurality of image-forming places;
    an optical-path-dividing member that divides an optical path from a plurality of observation positions of the sample different in a direction of an optical axis of the image-forming lens so as to form the plurality of image-forming places;
    an optical-path-length-changing member that is provided on at least one optical path between the plurality of image-forming places and the imaging lens and changes optical path length of the light divided by the optical-path-dividing member; and
    an imaging member that is provided on the plurality of image-forming places and makes it possible to take images of the sample divided by the optical-path-dividing member at the same time.

2. The imaging apparatus according to claim 1, wherein the number of the imaging member is one.

3. The imaging apparatus according to claim 2, wherein the imaging member forms images corresponding to the plurality of observation positions different in the optical axis direction on the imaging surface of the imaging member side by side.

4. The imaging apparatus according to claim 2, wherein the optical-path-dividing member includes a semi-transparent mirror that transmits light from the image-forming lens to form an image on a first image-forming position and reflects the light from the image-forming lens in a direction perpendicular to the transmission light and parallel to the imaging surface of the imaging member to form an image on a second image-forming position other than the first image-forming position, and a reflection mirror that reflects light reflected by the semi-transparent mirror in a direction to the second image-forming position of the imaging member, and
    the optical-path-length-changing member is provided on at least one exit portion of the semi-transparent mirror and the reflection mirror.

5. The imaging apparatus according to claim 2, wherein the optical-path-dividing member includes a first semi-transparent mirror that transmits light from the image-forming lens to form an image on a first image-forming position of the imaging member and reflects the light from the image-forming lens in a direction perpendicular to the transmission light and parallel to the imaging surface of the imaging member to form an image on a second image-forming position of the imaging member other than the first image-forming position,
    a second semi-transparent mirror that reflects light transmitted through the first semi-transparent mirror in a direction to the second image-forming position, and transmits the light transmitted through the first semi-transparent mirror in a direction parallel to the imaging surface of the imaging member to form an image on a third image-forming position of the imaging member other than the first and the second image-forming positions, and a reflection mirror that reflects light transmitted through the second semi-transparent mirror in a direction to the third image-forming position of the imaging member, and optical-path-length-changing members for leading light having different optical path length with each other to the imaging member being provided on at least two exit portion of the first semi-transparent mirror, the second semi-transparent mirror and the reflection mirror.

6. The imaging apparatus according to claim 2, wherein the optical-path-dividing member divides light forming an image by the image-forming lens into at least three optical paths in order to form images of the sample on at least three image-forming places of the imaging member.

7. The imaging apparatus according to claim 6, wherein the three optical paths divided by the optical-path-dividing member are come from three observation positions different in the optical axis direction, and in the three image-forming places formed on the imaging member, an intermediate observation position among the three observation positions forms an image at the center of the imaging surface of the imaging member, and light from an upper observation position and light from a lower observation position among the three observation positions are divided into both sides of the image-forming place of the intermediate observation position formed at the center of the imaging member.

8. The imaging apparatus according to claim 2, wherein the optical-path-length-changing member is a plurality of plane parallel plates having different thickness along the optical axis.

9. The imaging apparatus according to claim 8, wherein a changing member that is provided on each divided optical path and removably inserting a given plane parallel plate into the optical path.

10. The imaging apparatus according to claim 2, wherein the optical-path-dividing member includes at least one semi-transparent mirror, and at least two image-forming places are formed on the imaging surface of the imaging member.

11. The imaging apparatus according to claim 10, wherein the at least one semi-transparent mirror has transmittance that makes light amount of each optical path divided by the optical-path-dividing member substantially uniform.

12. The imaging apparatus according to claim 11, wherein the at least one semi-transparent mirror is composed of a semi-transparent mirror that is provided on an exit optical path of the image-forming lens and has transmittance of substantially 30%, a semi-transparent mirror that is provided adjacent to the semi-transparent mirror having transmittance of substantially 30% and has transmittance of substantially 50%, and a total reflection mirror that is provided adjacent to the semi-transparent mirror having transmittance of substantially 50%.

13. A microscope equipped with the imaging apparatus according to claim 1.

14. An imaging apparatus comprising:
an image-forming lens that forms images of a sample on a plurality of image-forming places;
an optical-path-length-changing member that is provided on an optical path between the plurality of image-forming places and the image-forming lens to form the plurality of image-forming places, includes a plurality of optical elements each of which changes optical path length of the light from the image-forming lens different with each other, moves in a direction perpendicular to the optical axis of the image-forming lens, and selectively disposes the optical element on the optical axis; and
an imaging member that takes images of the sample.

15. The imaging apparatus according to claim 14, wherein the optical-path-length-changing member is a turret holding a plurality of optical elements.

16. An imaging apparatus comprising:
a semi-transparent mirror that divides an image of a sample into a plurality of directions;
a first optical-path-length-changing member having a first image-forming lens that one side of light divided by the semi-transparent mirror is incident thereon, forms an image of the sample on an image-forming place, and leads to any one of plurality of optical elements for changing optical path length of the light from the sample into a different length;
a second optical-path-length-changing member having a second image-forming lens that the other side of light divided by the semi-transparent mirror is incident thereon, forms an image of the sample on an image-forming place, and leads to any one of plurality of optical elements for changing optical path length of the light from the sample into a different length;
a first imaging member for taking an image of the sample that is formed by the first image-forming lens and changed the optical path thereof by the first optical-path-length-changing member; and
a second imaging member for taking an image of the sample that is formed by the second image-forming lens and changed the optical path thereof by the second optical-path-length-changing member.

* * * * *